(No Model.)

D. C. LOCKWOOD.
CHECK HOOK.

No. 306,408. Patented Oct. 14, 1884.

Witnesses.
A. Ruppert.
Edgar T. Gaddis

Inventor.
D. C. Lockwood
by J. R. Nottingham
Atty

UNITED STATES PATENT OFFICE.

DAVID C. LOCKWOOD, OF NEWARK, NEW JERSEY, ASSIGNOR TO THE RUBBER AND CELLULOID HARNESS TRIMMING COMPANY, OF SAME PLACE.

CHECK-HOOK.

SPECIFICATION forming part of Letters Patent No. 306,408, dated October 14, 1884.

Application filed April 24, 1883. (No model.)

*To all whom it may concern:*

Be it known that I, DAVID C. LOCKWOOD, of Newark, in the State of New Jersey, have invented certain new and useful Improvements in Hinged Pad-Hooks for Check-Reins of Harness; and I do hereby declare that the following is a correct description thereof, reference being had to the accompanying drawings.

Figure 1:
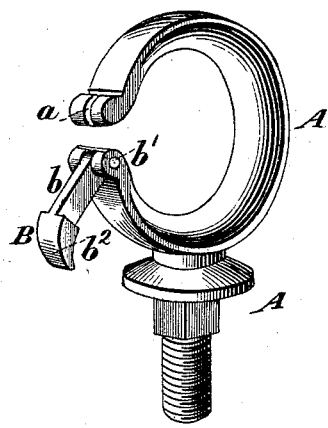
Figure 2:
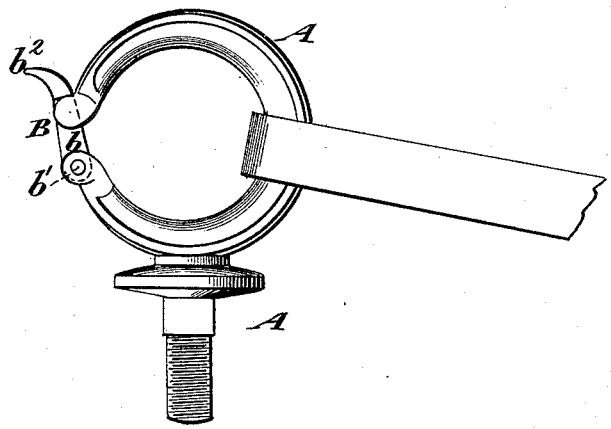

Figure 1 is a perspective view of my invention with the locking-arm out of engagement, and Fig. 2 a side elevation with the arm locked in position to support the ring or hook.

In ordinary check-rein hooks, (this being the generic name of the class,) when a horse stumbles there is a very great strain upon the hook, often sufficient to nearly straighten or destroy it. This is obviously because (see Fig. 1) there is a break in the continuity of the ring.

My invention is designed to support the hook, and to this end the hook A has a slot, $a$, which receives the shank $b$ of a locking-arm, B, pivoted at $b'$ to the hook, as shown. The arm B has a head, $b^2$, which rests upon the upper side of the hook, and when the arm is in position, as shown in Fig. 2, prevents the hook from spreading or straightening. This pivoted locking-arm B prevents the check-rein from becoming disengaged from the hook, but in that capacity alone it is not new.

The importance of the invention lies in its adaptation to support the hook against great strain.

I am aware that pivoted arms with rings have been employed to retain check-reins against accidental displacement, and also that a spring has been made to interlock with the check-hook; but my invention is for a different purpose, and one which such construction would not serve.

What I claim as new is—

In combination with the check-rein hook A, having slot $a$, the pivoted arm B, having shank $b$ and head $b^2$, adapted to engage the hook and support the same, as and for the purpose set forth.

DAVID C. LOCKWOOD.

Witnesses:
J. C. CLAYTON,
CHAS. BURROUGHS.